United States Patent
Shoemaker

[11] 3,746,428
[45] July 17, 1973

[54] OIL IMMERSION TYPE MICROSCOPE OBJECTIVE

[75] Inventor: Arthur M. Shoemaker, East Aurora, N.Y.

[73] Assignee: American Optical Corporation, Southbridge, Mass.

[22] Filed: Apr. 17, 1970

[21] Appl. No.: 28,248

Related U.S. Application Data

[63] Continuation of Ser. No. 793,477, Jan. 23, 1969, abandoned, which is a continuation-in-part of Ser. No. 783,078, Dec. 11, 1968, Pat. No. 3,537,772.

[52] U.S. Cl........... 350/214, 350/175 ML, 350/176, 350/177
[51] Int. Cl........................ G02b 9/00, G02b 21/00
[58] Field of Search ............. 350/175 ML, 175 MO, 350/176, 177, 214

[56] References Cited
UNITED STATES PATENTS

| | | | |
|---|---|---|---|
| 3,507,554 | 4/1970 | Benford | 350/177 |
| 3,525,562 | 8/1970 | Klein | 350/176 X |
| 3,530,436 | 9/1970 | Bertele et al. | 350/175 ML |

OTHER PUBLICATIONS

H. C. Claussen, "Microscope Objectives with Plano Correction" Applied Optics, Sept. 1964, Vol. 3, No. 9 pp. 993-1003

*Primary Examiner*—David Schonberg
*Assistant Examiner*—Paul A. Sacher
*Attorney*—William C. Nealon, Noble S. Williams and Robert J. Bird

[57] ABSTRACT

A seven member apochromatic microscope objective having a numerical aperture of substantially 1.30 and a magnification of substantially 100X.

7 Claims, 1 Drawing Figure

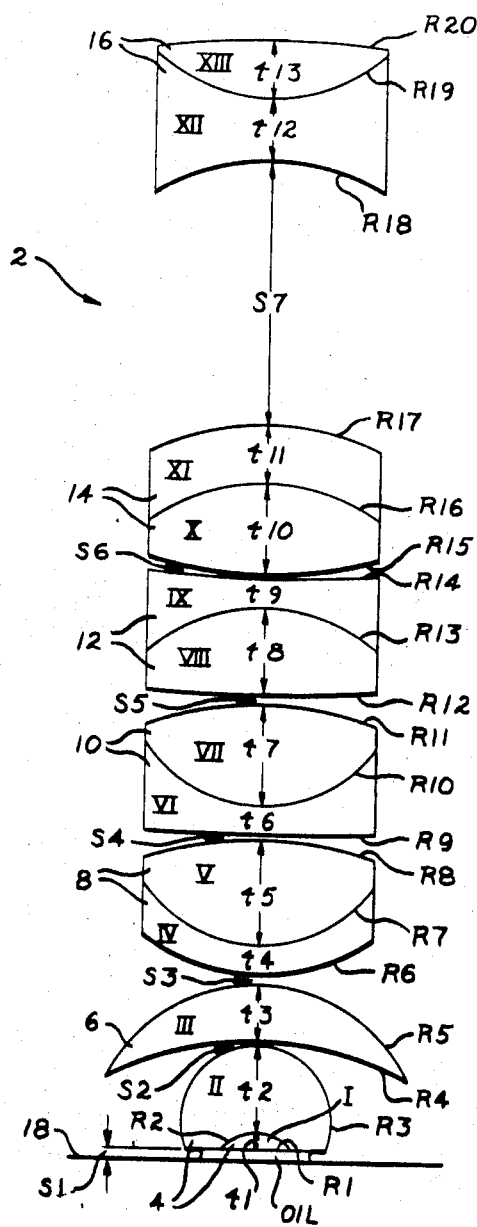

OIL IMMERSION TYPE MICROSCOPE OBJECTIVE

This application is a continuation of my earlier now abandoned application Ser. No. 793,477 filed Jan. 23, 1969 and which in turn is a continuation-in-part of my earlier copending application Ser. No. 783,078 now U.S. Pat. No. 3537772 filed Dec. 11, 1968.

The present invention relates to a microscope objective. More specifically, the invention is of an apochromatic oil immersion microscope objective.

An object of the present invention is to provide an apochromatic oil immersion microscope objective having a numerical aperture of substantially 1.30 and a magnification of substantially 100X, in which chromatic aberrations over the entire visible spectrum and spherical aberration, coma, and astigmatism are well corrected while yet providing a substantially flat image field.

DRAWING

In the drawing:

A microscope objective according to the present invention is represented by a plurality of lenses viewed transversely to their axes.

DESCRIPTION

Referring now to the drawing, a microscope objective is generally shown at 2. It includes a front doublet 4, a single lens 6, and doublets 8, 10, 12, 14 and 16, all of said lenses being in axial alignment. Objective 2 is disposed relative to an object plane 18 as shown in the drawing. A capillary oil space exists between plane 18 and doublet 4. Positive doublet 4 includes a plano-convex lens I and a concavo-convex lens II. Lens 6 is a concavo-convex positive meniscus shaped lens, also designated as III.

Doublet 8 includes a convex-concavo lens IV and a double convex lens V, together forming a positive double convex doublet. Doublet 10 includes a double-concavo lens VI and a double convex lens VII, together forming a concavo convex doublet. Doublet 12 includes a double convex lens VIII and a double concave lens IX, together forming a negative convex-concavo doublet. Doublet 14 includes a double convex lens X and a concavo-convex lens XI, together forming a positive double convex doublet. Doublet 16 includes a double concave lens XII and a double convex lens XIII, together forming a concavo-convex doublet.

The lens parameters are as follows: The successive lens radii are designated R1 – R20, where a minus sign indicates radii on centers of curvature lying on the object side of their vertices. The axial thicknesses of successive lens elements are designated T1 – T13. The successive axial spaces from the object plane 18 are designated S1 – S7. The refractive indices of the glass in successive lens elements are designated ND1 – ND13. The Abbe numbers of the successive lens glasses are designated $\gamma 1 - \gamma 13$.

The above-mentioned parameters are related to the focal length according to the following constructional data:

Magnification = 100X    N.A. = 1.30

| Lens | Radius, R | Thickness, T | Space, S | Refractive index, ND | Abbé number, $\nu$ |
|---|---|---|---|---|---|
| | | | S1 = .1751F | | |
| I | R1 = Plano | T1 = 1290F | | ND1 = 1.51700 | $\nu$1 = 64.50 |
| II | R2 = .9047F | T2 = 1.6108F | | ND2 = 1.80264 | $\nu$2 = 46.75 |
| | R3 = −1.4258F | | S2 = .0109F | | |
| III | R4 = −6.3949F | T3 = 1.0669F | | ND3 = 1.78833 | $\nu$3 = 50.47 |
| | R5 = −3.3249F | | S3 = .1641F | | |
| IV | R6 = 3.9667F | T4 = .5471F | | ND4 = 1.64316 | $\nu$4 = 47.95 |
| V | R7 = 2.8872F | T5 = 1.9484F | | ND5 = 1.43381 | $\nu$5 = 94.93 |
| | R8 = −7.2102F | | S4 = .0170F | | |
| VI | R9 = −402.2170F | T6 = .5471F | | ND6 = 1.68049 | $\nu$6 = 37.36 |
| VII | R10 = 2.7412F | T7 = 2.0107F | | ND7 = 1.43381 | $\nu$7 = 94.93 |
| | R11 = −6.5093F | | S5 = .1702F | | |
| VIII | R12 = 31.3022F | T8 = 1.6584F | | ND8 = 1.43381 | $\nu$8 = 94.93 |
| IX | R13 = −3.4776F | T9 = .5471F | | ND9 = 1.68049 | $\nu$9 = 37.36 |
| | R14 = 25.6639F | | S6 = .0142F | | |
| X | R15 = 7.9008F | T10 = 1.7399F | | ND10 = 1.43381 | $\nu$10 = 94.93 |
| XI | R16 = −3.9038F | T11 = 1.0943F | | ND11 = 1.68049 | $\nu$11 = 37.36 |
| | R17 = −5.1934F | | S7 = 5.0539F | | |
| XII | R18 = −4.4482F | T12 = 1.1424F | | ND12 = 1.78833 | $\nu$12 = 50.47 |
| XIII | R19 = 3.3977F | T13 = 1.0696F | | ND13 = 1.78446 | $\nu$13 = 25.75 |
| | R20 = −18.0199F | | | | |

The foregoing parameters of radius, thickness, and space are in units of millimeters and are based on the value of F. The value of F in this case, as an example is 1.8277 mm. Given in absolute values, the foregoing data is as follows:

F = 1.8277    Magnification = 100X    N.A. = 1.30

F=1.8277    Magnification=100X    N.A.=1.30

| Lens | Radius, R | Thickness, T | Space, S | Refractive index, ND | Abbé number, ν |
|---|---|---|---|---|---|
| | R1=Plano | | S1=.32 | | |
| I | | T1=.53 | | ND1=1.51700 | ν1=64.50 |
| | R2=1.653 | | | | |
| II | | T2=2.944 | | ND2=1.80264 | ν2=46.75 |
| | R3=2.606 | | | | |
| | | | S2=.020 | | |
| | R4=−11.688 | | | | |
| III | | T3=1.950 | | ND3=1.78833 | ν3=50.47 |
| | R5=−6.077 | | | | |
| | | | S3=.300 | | |
| | R6=7.250 | | | | |
| IV | | T4=1.000 | | ND4=1.64316 | ν4=47.95 |
| | R7=5.277 | | | | |
| V | | T5=3.561 | | ND5=1.43381 | ν5=94.93 |
| | R8=−13.178 | | | | |
| | | | S4=.031 | | |
| | R9=−735.132 | | | | |
| VI | | T6=1.000 | | ND6=1.68049 | ν6=37.36 |
| | R10=5.010 | | | | |
| VII | | T7=3.675 | | ND7=1.43381 | ν7=94.93 |
| | R11=−11.897 | | | | |
| | | | S5=.311 | | |
| | R12=57.211 | | | | |
| VIII | | T8=3.031 | | ND8=1.43381 | ν8=94.93 |
| | R13=−6.356 | | | | |
| IX | | T9=1.000 | | ND9=1.68049 | ν9=37.36 |
| | R14=46.906 | | | | |
| | | | S6=.026 | | |
| | R15=14.550 | | | | |
| X | | T10=3.180 | | ND10=1.43381 | ν10=94.93 |
| | R16=−7.135 | | | | |
| XI | | T11=2.000 | | ND11=1.68049 | ν11=37.36 |
| | R17=−9.492 | | | | |
| | | | S7=9.237 | | |
| | R18=−8.130 | | | | |
| XII | | T12=2.088 | | ND12=1.78833 | ν12=50.47 |
| | R19=6.210 | | | | |
| XIII | | T13=1.955 | | ND13=1.78446 | ν13=25.75 |
| | R20=−32.935 | | | | |

A novel feature of this Apochromatic Objective is that components 4, 6 and 8 are identical to the first three components used in the flat field oil immersion achromatic objective described in my patent application entitled "Oil Immersion Type Microscope Objective", Ser. No. 783,078, filed Dec. 11, 1968 now U.S. Pat. No. 3,537,772. In essence, this was achieved by adding two doublet components using calcium fluoride and short flint to correct the secondary spectrum.

It will be apparent that the foregoing absolute values are variable depending on the value of F. Other forms are thus possible and changes may be made in the values of the constructional data based on the relationships in the first of the above charts, without departing from the spirit of this invention.

What is claimed is:

1. An apochromatic microscope objective having a magnification of substantially 100X and a numerical aperture of substantially 1.30 for forming an image of an object plane, said image being well corrected for chromatic aberrations over the entire visible spectrum and for spherical aberrations, coma, astigmatism, and curvature of image field, said objective comprising:
   a front plano-convex lens member I;
   a second concavo-convex lens member II;
   said front and second members forming a doublet;
   a third concavo-convex lens member III;
   a fourth convex-concavo lens member IV;
   a fifth double convex lens member V;
   said fourth and fifth members forming a doublet;
   a sixth double concave lens member VI;
   a seventh double convex lens member VII;
   said sixth and seventh members forming a doublet;
   an eighth double convex lens member VIII;
   a ninth double concave lens member IX;
   said eighth and ninth members forming a doublet;
   a tenth double convex lens member X;
   an eleventh concavo-convex lens member XI;
   said tenth and eleventh members forming a doublet;
   a twelfth double concave lens member XII;
   a thirteenth double convex lens member XIII;
   said twelfth and thirteenth members forming a doublet;
   all of said lens members being axially aligned; and
   the parameters of lens radii (R1 - R20), lens thicknesses (T1 - T13), axial spaces among lens element and object plane (S1 - S7), refractive indices (ND1 - ND13), and Abbe numbers (γ1 - γ13), being determined by the following relationship:

| Lens | Radius, R | Thickness, T | Space, S | Refractive index, ND | Abbé number, ν |
|---|---|---|---|---|---|
| | R1=Plano | | S1=.1751F | | |
| I | | T1=.290F | | ND1=1.51700 | ν1=64.50 |
| | R2=−.9047F | | | | |
| II | | T2=1.6108F | | ND2=1.80264 | ν2=46.75 |
| | R3=−1.4258F | | | | |
| | | | S2=.0109F | | |
| | R4=−6.3949F | | | | |

| Lens | Radius, R | Thickness, T | Space, S | Refractive index, ND | Abbé number, ν |
|---|---|---|---|---|---|
| III | | T3=1.0669F | | ND3=1.78833 | ν3=50.47 |
| | R5=−3.3249F | | S3=.1641F | | |
| | R6=3.9667F | | | | |
| IV | R7=2.8872F | T4=.5471F | | ND4=1.64316 | ν4=47.95 |
| V | R8=−7.1102F | T5=1.9484F | | ND5=1.43381 | ν5=94.93 |
| | R9=−402.2170F | | S4=.0170F | | |
| VI | R10=2.7412F | T6=.5471F | | ND6=1.68049 | ν6=37.36 |
| VII | R11=−6.5093F | T7=2.0107F | | ND7=1.43381 | ν7=94.93 |
| | R12=31.3022F | | S5=.1702F | | |
| VIII | R13=−3.4776F | T8=1.6584F | | ND8=1.43381 | ν8=94.93 |
| IX | R14=25.6639F | T9=.5471F | | ND9=1.68949 | ν9=37.36 |
| | R15=7.9608F | | S6=.0142F | | |
| X | R16=−3.9038F | T10=1.7399F | | ND10=1.43381 | ν10=94.93 |
| XI | R17=−5.1934F | T11=1.0943F | | ND11=1.68049 | ν11=37.36 |
| | R18=−4.4482F | | S7=5.0539F | | |
| XII | R19=3.3977F | T12=1.1424F | | ND12=1.78833 | ν12=50.47 |
| XIII | R20=−18.0199F | T13=1.0696F | | ND13=1.78446 | ν13=25.75 |

2. An apochromatic microscope objective having a magnification of substantially 100X and a numerical aperture of substantially 1.30 for forming an image of an object plane, said image being well corrected for chromatic aberrations over the entire visible spectrum and for spherical aberrations, coma, astigmatism, and curvautre of image field, said objective comprising:
  a front plano-convex lens member I;
  a second concavo-convex lens member II;
  said front and second members forming a doublet;
  a third concavo-convex lens member III;
  a fourth convex-concavo lens member IV;
  a fifth double convex lens member V;
  said fourth and fifth members forming a doublet;
  a sixth double concave lens member VI;
  a seventh double convex lens member VII;
  said sixth and seventh members forming a doublet;
  an eighth double convex lens member VIII;
  a ninth double concave lens member IX;
  said eighth and ninth members forming a doublet;
  a tenth double convex lens member X;
  an eleventh concavo-convex lens member XI;
  said tenth and eleventh members forming a doublet;
  a twelfth double concave lens member XII;
  a thirteenth double convex lens member XIII;
  said twelfth and thirteenth members forming a doublet;
  all of said lens members being axially aligned; and
  the parameters of lens radii (R1 − R20), lens thicknesses (T1 − T13), axial spaces among lens element and object plane (S1 − S7), refractive indices (ND1 − ND13), and Abbe numbers (γ1 − γ13), being determined by the following relationship:

| Lens | Radius, R | Thickness, T | Space, S | Refractive index, ND | Abbé number, ν |
|---|---|---|---|---|---|
| | R1=Plano | | S1=.32 | | |
| I | R2=−1.653 | T1=.53 | | ND1=1.51700 | ν1=64.50 |
| II | R3=−2.606 | T2=2.944 | | ND2=1.80264 | ν2=46.75 |
| | R4=−11.688 | | S2=.020 | | |
| III | R5=−6.077 | T3=1.950 | | ND3=1.78833 | ν3=50.47 |
| | R6=7.250 | | S3=.300 | | |
| IV | R7=5.277 | T4=1.000 | | ND4=1.64316 | ν4=47.95 |
| V | R8=−13.178 | T5=3.561 | | ND5=1.43381 | ν5=94.93 |
| | R9=−735.132 | | S4=.031 | | |
| VI | R10=5.010 | T6=1.000 | | ND6=1.68049 | ν6=37.36 |
| VII | R11=−11.897 | T7=3.675 | | ND7=1.43381 | ν7=94.93 |
| | R12=57.211 | | S5=.311 | | |
| VIII | R13=−6.356 | T8=3.031 | | ND8=1.43381 | ν8=94.93 |
| IX | R14=46.906 | T9=1.000 | | ND9=1.68049 | ν9=37.36 |
| | R15=14.550 | | S6=.026 | | |
| X | R16=−7.135 | T10=3.180 | | ND10=1.43381 | ν10=94.93 |
| XI | R17=−9.402 | T11=2.000 | | ND11=1.68049 | ν11=37.36 |
| | R18=−8.130 | | S7=9.237 | | |
| XII | R19=6.120 | T12=2.088 | | ND12=1.78833 | ν12=50.47 |
| XIII | R20=−32.085 | T13=1.955 | | ND13=1.78446 | ν13=25.75 |

3. A standardized component of an achromatic-apochromatic microscope objective including:
   a front plano-convex lens member I;
   a second concavo-convex lens member II;
   said front and second members forming a doublet;
   a third concavo-convex lens member III;
   a fourth convex-concavo lens member IV;
   a fifth double convex lens member V;
   said fourth and fifth members forming a doublet;
   all of said lens members being axially aligned;
   the parameters of lens radii (R), lens thicknesses (T), axial spaces among lens elements and object plane (S), refractive indices (ND), and Abbe numbers ($\gamma$), being determined by the following relationship:

| Lens | Radius, R | Thickness, T | Space, S | Refractive index, ND | Abbé number, $\nu$ |
|---|---|---|---|---|---|
|  |  |  | S1=.1751F |  |  |
| I | R1=Plano | T1=.290F |  | ND1=1.51700 | $\nu$1=64.50 |
|  | R2=−.9047F |  |  |  |  |
| II |  | T2=1.6108F |  | ND2=1.80264 | $\nu$2=46.75 |
|  | R3=−1.4258F |  | S2=.0109F |  |  |
|  | R4=−6.3949F |  |  |  |  |
| III |  | T3=1.0669F |  | ND3=1.78833 | $\nu$3=50.47 |
|  | R5=−3.3249F |  | S3=.1641F |  |  |
|  | R6=3.9667F |  |  |  |  |
| IV |  | T4=.5471F |  | ND4=1.64316 | $\nu$4=47.95 |
|  | R7=2.8872F | T5=1.9484F |  | ND5=1.43381 | $\nu$5=94.93 |
|  | R8=−7.2102F |  |  |  |  |

4. A microscope objective as defined in claim 3 and further including:
   a sixth double concave lens member VI;
   a seventh double convex lens member VII;
   said sixth and seventh members forming a doublet;
   an eighth double convex lens member VIII;
   a ninth double concave lens member IX;
   said eighth and ninth members forming a doublet;
   a tenth double convex lens member X;
   an eleventh concavo-convex lens member XI;
   said tenth and eleventh members forming a doublet;
   a twelfth double concave lens member XII;
   a thirteenth double convex lens member XIII;
   said twelfth and thirteenth members forming a doublet;
   the parameters being determined by the following relationship:

5. A microscope objective having a five-member standardized component useful in both apochromatic and achromatic objectives, said standardized component consisting of:
   a front plano-convex lens element;
   a second concavo-convex lens element;
   said front and second element forming a doublet;
   a third concavo-convex lens element;
   a fourth convex-concavo lens element;
   a fifth double convex lens element;
   said fourth and fifth elements forming a doublet;
   all of said lens elements being axially aligned.

6. A microscope objective including a component defined in claim 5 and further including:
   a sixth double-concave lens element;
   a seventh double convex lens element;
   said sixth and seventh elements forming a doublet;
   an eighth double convex lens element;
   a ninth double concave lens element;
   said eighth and ninth elements forming a doublet;
   said microscope objective being achromatic in character and being well corrected for spherical and chromatic aberrations, coma, astigmatism, and curvature of image field.

7. A microscope objective including the component defined in claim 5 and further including:
   a sixth double-concave lens element;
   a seventh double convex lens element;
   said sixth and seventh elements forming a doublet;
   an eighth double convex lens element;
   a ninth double concave lens element;
   said eighth and ninth elements forming a doublet;

| Lens | Radius, R | Thickness, T | Space, S | Refractive index, ND | Abbé number, $\nu$ |
|---|---|---|---|---|---|
|  |  |  | S4=.0170F |  |  |
|  | R9=−402.2170F |  |  |  |  |
| VI |  | T6=.5471F |  | ND6=1.68049 | $\nu$6=37.36 |
|  | R10=2.7412F |  |  |  |  |
| VII |  | T7=2.0107F |  | ND7=1.43381 | $\nu$7=94.98 |
|  | R11=−6.5093F |  | S5=.1702F |  |  |
|  | R12=31.3022F |  |  |  |  |
| VIII |  | T8=1.6484F |  | ND8=1.43381 | $\nu$8=94.93 |
|  | R13=−3.4776F |  |  |  |  |
| IX |  | T9=.5471F |  | ND9=1.68049 | $\nu$9=37.36 |
|  | R14=25.6639F |  | S6=.0142F |  |  |
|  | R15=7.9608F |  |  |  |  |
| X |  | T10=1.7399F |  | ND10=1.43381 | $\nu$10=94.93 |
|  | R16=−3.9038F |  |  |  |  |
| XI |  | T11=1.0943F |  | ND11=1.68049 | $\nu$11=37.36 |
|  | R17=−5.1934F |  | S7=5.0539F |  |  |
|  | R18=−4.4482F |  |  |  |  |
| XII |  | T12=1.1424F |  | ND12=1.78833 | $\nu$12=50.47 |
|  | R19=3.3977F | T13=1.0696F |  | ND13=1.78446 | $\nu$13=25.75 |
|  | R20=−18.0199F |  |  |  |  | a tenth double convex lens element;
an eleventh concavo-convex lens element;
said tenth and eleventh elements forming a doublet;
a twelfth double concave lens element;
a thirteenth double convex lens element;
said twelfth and thirteenth elements forming a doublet;

said microscope objective being apochromatic in character and being well corrected for chromatic aberrations over the entire visible spectrum and for spherical aberrations, coma, astigmatism, and curvature of image field.

* * * * *